(12) United States Patent
Brinkmann et al.

(10) Patent No.: US 9,359,936 B2
(45) Date of Patent: Jun. 7, 2016

(54) SYSTEM AND OPERATING METHOD FOR A SUPERCHARGED INTERNAL COMBUSTION ENGINE WITH CHARGE-AIR COOLING

(71) Applicant: Ford Global Technologies, LLC, Dearborn, MI (US)

(72) Inventors: Bernd Brinkmann, Dormagen (DE); Harald Kaufeld, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 13/909,943

(22) Filed: Jun. 4, 2013

(65) Prior Publication Data

US 2013/0333674 A1     Dec. 19, 2013

(30) Foreign Application Priority Data

Jun. 13, 2012   (DE) .......................... 10 2012 209 893

(51) Int. Cl.
| | |
|---|---|
| *F02B 33/00* | (2006.01) |
| *F02B 29/04* | (2006.01) |
| *F25B 9/00* | (2006.01) |
| *B60H 1/00* | (2006.01) |
| *F02B 37/00* | (2006.01) |
| *F02D 13/02* | (2006.01) |

(52) U.S. Cl.
CPC ............ *F02B 33/00* (2013.01); *B60H 1/00878* (2013.01); *F02B 29/0443* (2013.01); *B60H 2001/00949* (2013.01); *F02B 37/00* (2013.01); *F02D 13/0203* (2013.01); *Y02T 10/146* (2013.01)

(58) Field of Classification Search
CPC .. F02B 29/0475; F02B 29/0443; F02B 33/00; F02B 37/00
USPC ..................... 123/563; 60/599, 614–620; 62/6
See application file for complete search history.

(56) References Cited

U.S. PATENT DOCUMENTS

| | | | | |
|---|---|---|---|---|
| 4,480,439 | A | * | 11/1984 | Yamane .............. F02B 29/0443 123/563 |
| 6,817,348 | B2 | | 11/2004 | Wettergard et al. |
| 7,296,562 | B2 | | 11/2007 | Withrow et al. |
| 2004/0055320 | A1 | * | 3/2004 | Horstmann et al. ............ 62/244 |

(Continued)

FOREIGN PATENT DOCUMENTS

| | | |
|---|---|---|
| DE | 69420834 T2 | 1/2000 |
| DE | 102006054227 A1 | 5/2008 |
| DE | 102008015591 A1 * | 10/2009 .............. F02M 25/07 |
| JP | 61061917 A * | 3/1986 .............. F02B 29/04 |

(Continued)

*Primary Examiner* — Kenneth Bomberg
*Assistant Examiner* — Ngoc T Nguyen
(74) *Attorney, Agent, or Firm* — Julia Voutyras; Alleman Hall McCoy Russell & Tuttle LLP

(57) ABSTRACT

A engine system, comprising a cylinder head with one or more cylinders, an outlet opening of a cylinder coupled to an exhaust line for discharging the exhaust gases via an exhaust-gas discharge system; an inlet opening of a cylinder coupled to an intake line for supplying charge air via an intake system, the intake system including one or more compressors for compressing the charge air and a charge-air cooler coupled to the intake system, the charge-air cooler including a first refrigerant evaporator through which a refrigerant and charge air can flow. The use of a refrigerant evaporator allows air charge to cool to a temperature below the ambient temperature.

18 Claims, 7 Drawing Sheets

(56) References Cited

U.S. PATENT DOCUMENTS

2008/0264609 A1* 10/2008 Lutz et al. ............... 165/104.19
2009/0211253 A1* 8/2009 Radcliff et al. ............... 60/670

FOREIGN PATENT DOCUMENTS

JP         11324673 A  * 11/1999  ............... F01P 7/19
WO    WO 2008069743 A1 *  6/2008  ............ F02B 37/013

* cited by examiner

SYSTEM AND OPERATING METHOD FOR A SUPERCHARGED INTERNAL COMBUSTION ENGINE WITH CHARGE-AIR COOLING

CROSS REFERENCE TO RELATED APPLICATIONS

The present application claims priority to German Patent Application No. 102012209893.3, filed on Jun. 13, 2012, the entire contents of which are hereby incorporated by reference for all purposes.

BACKGROUND AND SUMMARY

Internal combustion engines may have at least one cylinder head and a cylinder block which are connected to one another to form the individual cylinders or combustion chambers. The cylinder head often accommodates the valves controlling charge exchange, wherein each cylinder has one or more outlet openings or exhaust lines for the discharge of the exhaust gases via an exhaust-gas discharge system and has one or more inlet opening or intake lines for the supply of charge air via an intake system. On the intake side of an internal combustion engine, a charge-air cooler may be arranged in the intake system. The charge-air cooler may lower the temperature of the charge air and thus increase the density of the charge air. In this way, the cooler contributes to an increased charging of the combustion chamber. Supercharged internal combustion engines are often equipped with a charge-air cooler. Charge-air cooling arrangements may also be provided in naturally aspirated engines.

The cooling of the charge air via a charge-air cooler serves, in part, to increase the power of the internal combustion engine. The air used in the combustion process may be compressed as a result of the cooling, thus a greater mass of may be supplied to each cylinder per working cycle. In this way, the fuel mass and therefore the mean pressure may increase.

Furthermore, a reduction of the temperature of the cylinder fresh charge from charge-air cooling may reduce thermal loading of the internal combustion engine and a lower concentration of nitrogen oxides ($NO_x$) in the exhaust gas thus reducing nitrogen oxide emissions.

In supercharged applied-ignition engine embodiments, auto-ignition may occur in the fuel-air mixture before the applied ignition is initiated, called knocking. These knocking events may be associated with high pressure gradients and intense noise generation, and may contribute to component degradation. Knocking may be counteracted by lowering the charge-air temperature, such that it may be possible and appropriate to dispense with conventional measures for preventing knocking, such as shifting the ignition time in the early direction. Thus, the disadvantages associated with the shift of the ignition time, specifically the resulting impairment of efficiency, may be reduced or eliminated.

Limiting the thermal loading of the internal combustion engine and/or preventing thermal overloading of individual engine components by lowering the temperature of the cylinder fresh charge, had been previously achieved using charge enrichment ($\lambda<1$). This is commonly performed so that both the temperatures in the combustion chamber and the exhaust-gas temperatures can be lowered. Here, more fuel is injected than can actually be burned with the provided quantity of air. Thus, the excess fuel is heated and evaporated, such that the temperature of the cylinder fresh charge falls as a result of internal cooling. However this approach results in increased fuel consumption and pollutant emission.

The inventors found that using a refrigerant evaporator cooler achieves a technical result of cooling charge air to prevent engine knock without reducing fuel efficiency. Further, air charge may be cooled prior to compression significantly decreasing the internal air charge pressure for increased engine power.

Thus, in an embodiment may include a supercharged engine having a cylinder head coupled to one or more cylinders. Each cylinder may have at least one outlet opening, coupled to an exhaust line for discharging the exhaust gases via an exhaust-gas discharge system. Each cylinder may have one or more inlet openings coupled to an intake line for supplying charge air via an intake system, wherein in the intake system may include at least one compressor for compressing the charge air and a charge-air cooler for cooling the charge air. The charge air cooler may be a refrigerant evaporator through which a refrigerant and the charge air can flow. Thus, the charge air may be cooled by at least partial evaporation of the refrigerant before entering the at least one compressor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
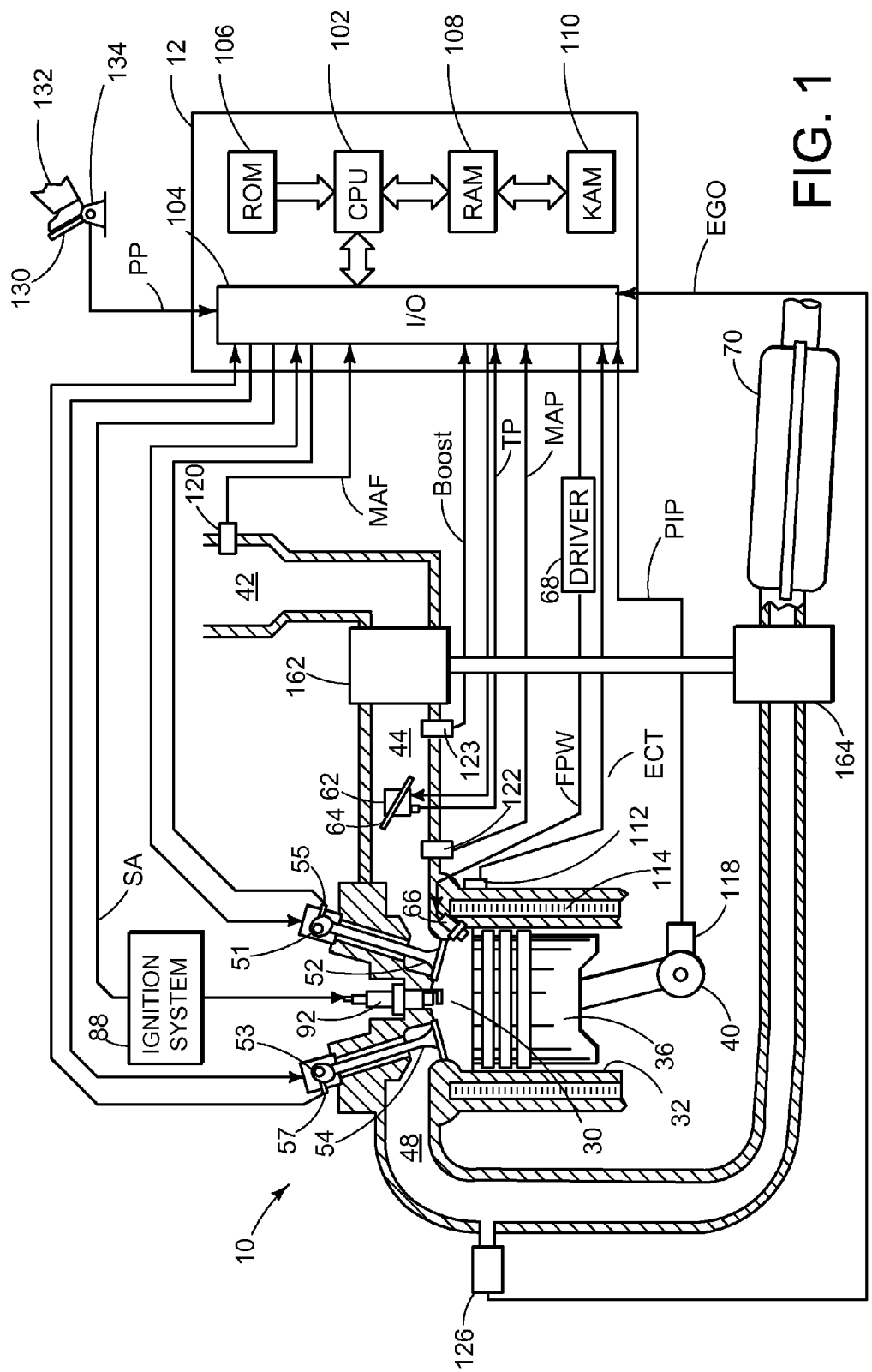
FIG. 1 is an example embodiment of an engine system.

Internal combustion engines are generally sensitive to changes in the operating limits of a charge-air cooler. Small changes in the temperature and/or in the mass of the air flow conducted through the charge-air cooler may cause relatively large fluctuations in the power output and the torque output of the engine. These effects are particularly pronounced in the case of supercharged engines, wherein charge air which has already been compressed in the compressor prior to cooling. In these embodiments the charge-air cooler is arranged downstream of the compressor in the intake system.

Charge-air cooling is particularly advantageous when the outside temperature is high. In countries with hot climates, such as Saudi Arabia, the ambient temperature and therefore the temperature of the charge air may regularly exceed 40° C. or 50° C. Conventional charge-air coolers may be air-cooled or coolant-operated charge-air coolers. In the latter case, water doped with additives may be used as coolant. Coolant extracts heat from the charge air. For this purpose, a temperature difference between the coolant and the charge air is desired for maximum efficiency because, when the charge-air temperature falls, the coolant temperature rises. Heat is then extracted from warm coolant by convection in a radiator which serves as a heat exchanger, wherein air flow generated by means of fans assists the air flow resulting from relative wind for cooling.

In principle, the charge-air temperature cannot be lowered to temperatures below the coolant temperature. Therefore, the coolant cannot be cooled below the ambient temperature. The temperature of the cooled charge air is normally higher than the ambient temperature.

The compression of charge air prior to cooling often poses problems. This is because, as a result of compression, the charge air can reach temperatures at the outlet of the compressor which may result in thermal loading of the components and assemblies provided downstream in the intake system, causing degradation. The temperature of the charge air at the outlet of the compressor may depend significantly on the temperature at the inlet of the compressor.

In the case of high ambient temperatures, it may therefore be desirable to limit or reduce the charge pressure so that the temperature of the compressed charge air at the outlet of the compressor does not exceed a predefinable maximum admissible temperature, for example 160° C. This may result in reduced power output and lead to reduced torque output and thus lower achievable maximum speed. Thus, the example embodiment may provide a supercharged engine and operating method with optimized charge-air cooling.

An embodiment may use a refrigerant-operated charge-air cooler, specifically a refrigerant evaporator, also known as a vapor-compressor refrigerator, which may achieve a technical result of considerably lower charge-air temperature.

In a refrigerant evaporator, the temperature of the air flow supplied to the compressor is reduced as it flows through the evaporator. Refrigerant flowing though the inside of the evaporator extracts the heat from the air flow and, in so doing, evaporates. Such refrigerant evaporators are already used in air-conditioning systems which normally operate on the basis of the cold vapor process and extract heat from the air flow supplied to the passenger compartment.

In contrast to a coolant-operated heat exchanger, a refrigerant evaporator achieves a technical result of lowering the charge-air temperature to temperatures below the ambient temperature. In a conventional charge-air cooling arrangement, the charge-air temperature inherently cannot be lowered below the, possibly high, outside temperature without limiting the charge pressure. In embodiments using a refrigerant evaporator, this limitation is eliminated.

In this respect, a disclosed embodiment may also have considerable advantages over embodiments in which the charge-air cooler is duly arranged upstream of the compressor but a coolant-operated charge-air cooler is used.

In addition to the refrigerant evaporator provided according to an embodiment for the purpose of charge-air cooling, an air-cooled or coolant-operated charge-air cooler may be provided upstream or downstream of the refrigerant evaporator according to an embodiment in order to reduce the amount of heat to be dissipated in the refrigerant evaporator. For example, charge air may be cooled to the ambient air temperature via an air-cooled or coolant operated charge-air cooler prior to delivery to the refrigerant evaporator charge-air cooler.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Cylinder (i.e., combustion chamber) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Cylinder 30 may receive intake air from intake manifold 44 via intake passage 42 and may exhaust combustion gases via exhaust passage 48. Intake manifold 44 and exhaust passage 48 can selectively communicate with cylinder 30 via respective intake valve 52 and exhaust valve 54. In some embodiments, cylinder 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection of fuel into cylinder 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, cylinder 30 may alternatively or additionally include a fuel injector arranged in intake passage 42 in a configuration that provides what is known as port injection of fuel into the intake port upstream of cylinder 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to cylinder 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to cylinder 30 via spark plug 92 in response to spark advance signal SA from controller 12, under select operating modes. Though spark ignition components are shown, in some embodiments, cylinder 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio. Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. One or more of a wastegate and a compressor bypass valve may also be included to control flow through the turbine and compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Further, a sensor 123 may be disposed in intake manifold 44 for providing a BOOST signal to controller 12.

Figure 4:
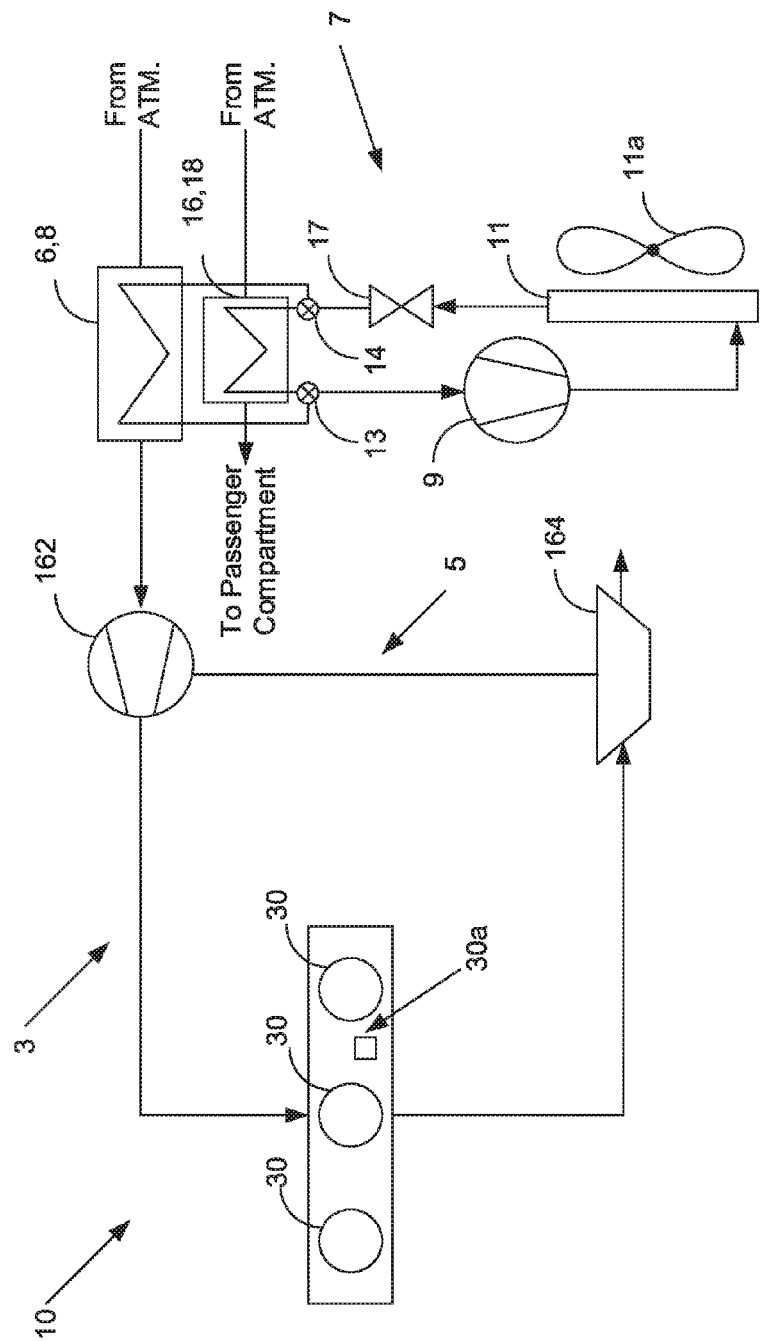
FIG. 4 schematically depicts an additional example embodiment of an intake and charge-air cooling circuit in combination with an air conditioning system.

Controller 12 is shown in FIG. 4 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses each revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows one cylinder of a multi-cylinder engine, and each cylinder may similarly include its own set of intake/exhaust valves, fuel injector, spark plug, etc. The refrigerant circuit 7 as depicted in FIGS. 2-4 below may be coupled to the intake passage 42 upstream or downstream of compressor 162.

Figure 2:
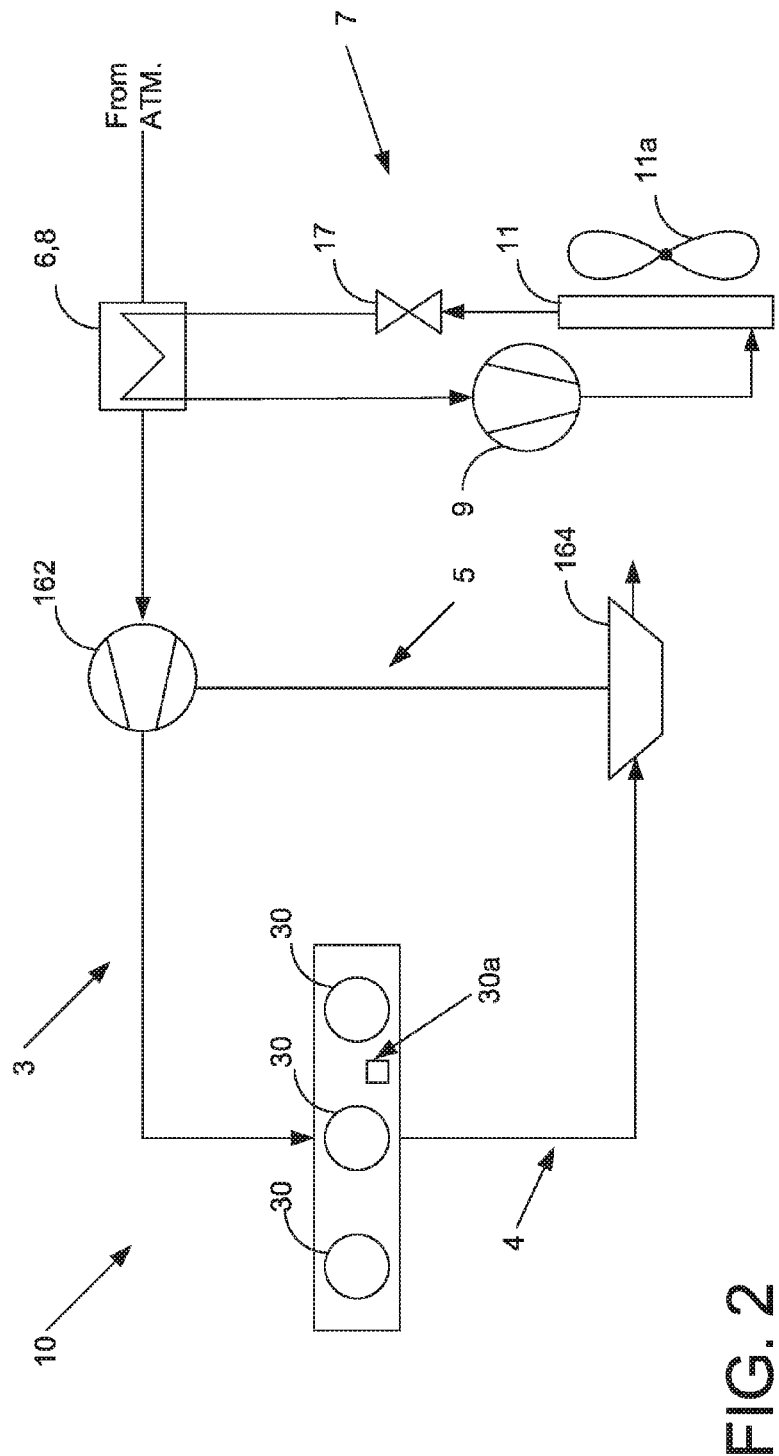
FIG. 2 schematically depicts an intake and charge-air cooling circuit.
Figure 3:
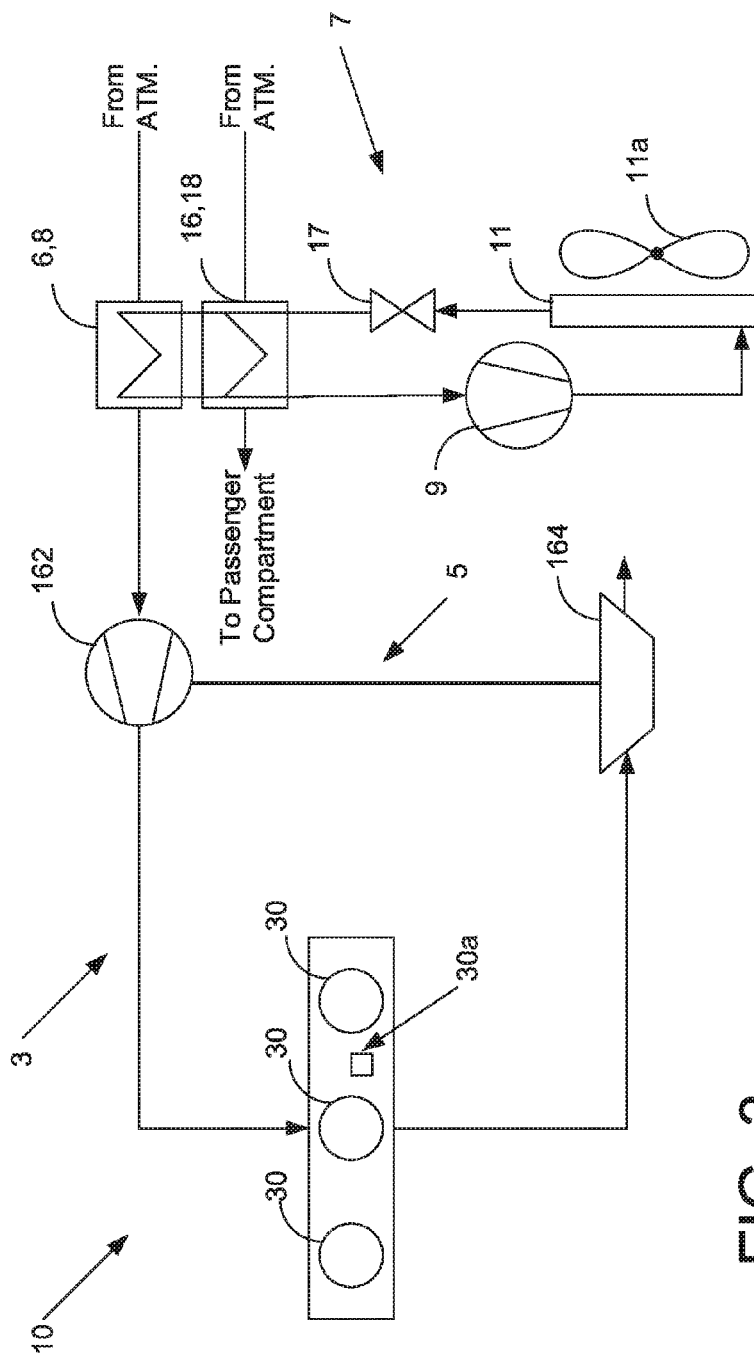
FIG. 3 schematically depicts an example embodiment of an intake and charge-air cooling circuit in combination with an air conditioning system.

FIG. 2 schematically depicts a first embodiment of the engine 10. Said engine is a three-cylinder in-line engine 10 in which the three cylinders 30 are arranged along the longitudinal axis of the cylinder head.

Charge air is supplied to the cylinders 30 via an intake system 3, wherein the exhaust gases are discharged from the cylinders 30 via an exhaust-gas discharge system 4.

For supercharging, the internal combustion engine 10 is equipped with an exhaust-gas turbocharger 5. The compressor 162 of the exhaust-gas turbocharger 5 is arranged in the intake system 3 and the associated turbine 164 is arranged in the exhaust-gas discharge system 4. The charge air supplied to the internal combustion engine 10 is compressed in the compressor 162, so that the enthalpy of the exhaust-gas flow is utilized in the turbine 164.

To cool the charge air, a charge-air cooler 6 is arranged upstream of the compressor 162 in the intake system 3. The charge-air cooler 6 is realized by a refrigerant evaporator 8 through which a refrigerant and the charge air flows and which cools the charge air before it enters the compressor 162 by at least partial evaporation of the refrigerant.

The evaporator 8 is part of a refrigerant circuit 7, wherein, downstream of the evaporator 8, the refrigerant flows through a compressor 9, a condenser 11 and, before entering the evaporator 8 again, an expansion valve 17. To increase the heat dissipation, the condenser 11 is equipped with a fan 11a.

In the example embodiment depicted in FIG. 1, the charge-air cooler 6 may be arranged upstream of the compressor 162, such that the charge air is cooled prior to compression. The temperature of the charge air at the inlet of the compressor is thereby lowered. Because the temperature of the charge air at the outlet of the compressor is significantly responsive to the inlet temperature, it is possible to influence the outlet temperature. By contrast, this possibility does not exist in the case of an arrangement of the cooler downstream of the compressor. In this respect, the compression process is limited to a lesser extent, because a lower inlet temperature is used as a starting point in the embodiment.

Nevertheless, embodiments of the internal combustion engine may also be advantageous in which the charge-air cooler, that is to say the first refrigerant evaporator, is arranged downstream of the at least one compressor. This is because the compressed charge air is at a significantly higher temperature than the charge air upstream of the compressor, as a result of which the temperature difference, which is significant for the heat transfer, between the charge air and the refrigerant or the cooling fluid (i.e., the air or the coolant) is greater, and a greater amount of heat may be dissipated.

In addition to the refrigerant evaporator provided for the purpose of charge-air cooling, an air-cooled or coolant-operated charge-air cooler may be provided upstream of the refrigerant evaporator according to an embodiment.

Advantageous embodiments of the engine may include at least one compressor that is a mechanical supercharger.

Embodiments of the engine may also be advantageous in which the at least one compressor is the compressor of an exhaust-gas turbocharger, the turbine of which is arranged in the exhaust-gas discharge system.

In an exhaust-gas turbocharger embodiment, the compressor and the turbine may be arranged on the same shaft. The hot exhaust-gas flow supplied to the turbine expands in the turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained. Note that a supercharger may refer to a turbocharger as well as a compressor that is power by other means such as electrical energy.

In contrast to a mechanical supercharger, an exhaust-gas turbocharger has no mechanical connection to the internal combustion engine for the purpose of transmitting power. While a mechanical supercharger draws the energy required for driving it entirely from the internal combustion engine, the exhaust-gas turbocharger utilizes the exhaust-gas energy of the hot exhaust gases.

In the above exhaust-gas turbocharging configuration, performance enhancement limitations may exist at some engine speed ranges. A torque drop is commonly observed in the event of a certain rotational speed being undershot. The torque characteristic of a supercharged internal combustion engine can be increased through various measures, for example by virtue of a plurality of superchargers, that may be exhaust-gas turbochargers and/or mechanical superchargers, being provided in a parallel and/or series arrangement.

Embodiments of the engine may be advantageous if a compressor, a condenser and an expansion valve are provided downstream of the first refrigerant evaporator so as to form a refrigerant circuit.

The refrigerant which may be at least partially evaporated in the charge-air cooler is compressed by means of the compressor to a higher pressure level at which it can subsequently release heat to the ambient air in the condenser. Before the liquefied refrigerant re-enters the evaporator to form a refrigerant circuit, the refrigerant may pass through an accumulator and an expansion valve for lowering the pressure level.

Embodiments may therefore advantageously provide an accumulator within the refrigerant circuit which is arranged downstream of the condenser.

FIG. 3 depicts a supercharged engine in vehicles with an air-conditioning system. Example embodiments may provide provided a second refrigerant evaporator 16, within the refrigerant circuit, through which the refrigerant and ambient air can flow and cools the ambient air before it enters a passenger compartment by at least partial evaporation of the refrigerant.

In particular for relatively hot countries, vehicles are generally equipped with air-conditioning systems in order to cool the passenger compartment down to comfortable temperatures even in the case of the high outside temperatures. Thus, it may be expedient for the air-conditioning system and the charge-air cooling arrangement to be combined in the manner depicted in FIG. 3, specifically in such a way that both circuits jointly utilize certain components of the cold vapor process in order to lower costs and reduce the space requirement in the engine bay. Some embodiment may provide one compressor, one condenser, one expansion valve and/or one accumulator.

In this arrangement, embodiments may be advantageous when the second refrigerant evaporator is arranged in parallel with the first refrigerant evaporator. Further embodiments, Such as that depicted in FIG. 4, may be advantageous wherein the second refrigerant evaporator 18 is arranged in a line which branches off from the refrigerant circuit 7 upstream of the first refrigerant evaporator 8 and which issues into the refrigerant circuit 7 downstream of the first refrigerant evaporator 8.

The parallel arrangement of the two refrigerant evaporators makes it possible, with the aid of one or more control elements, to deactivate and activate the first refrigerant evaporator and/or the second refrigerant evaporator via valves 13 and 14, and to control the refrigerant flows through the refrigerant evaporators 8 and 18.

Figure 5:
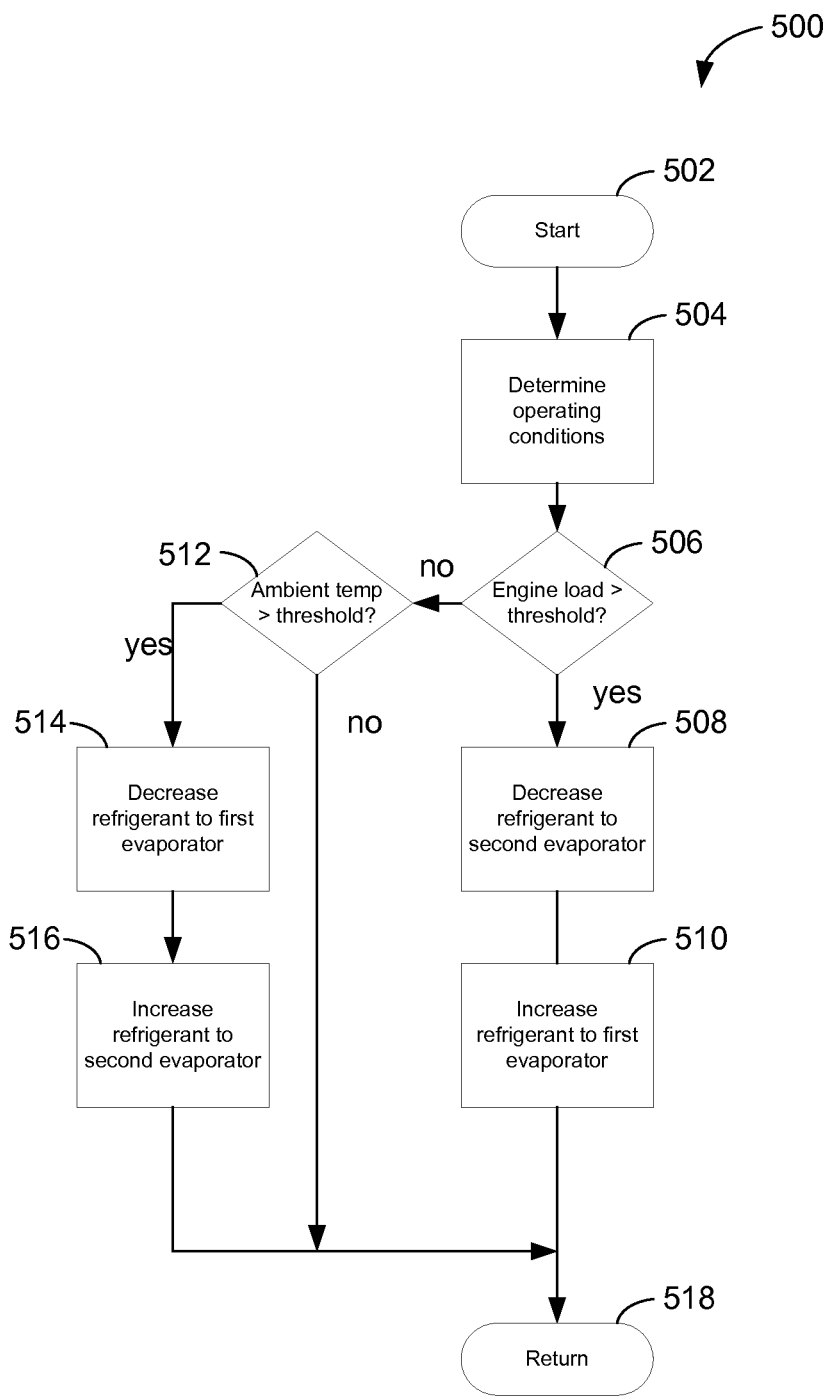
FIG. 5 shows an example control routine of a charge-air cooler.

An example control routine 500 is shown in FIG. 5. At high loads, such as arise for acceleration processes and uphill driving for example, the first refrigerant evaporator 8 which serves as a charge-air cooler 6 may extract relatively large amounts of heat from the charge air. Thus, deactivating the second refrigerant evaporator 18 or conducting the majority of the refrigerant through the first refrigerant evaporator via valve 14, may be advantageous under these conditions.

By contrast, in the case of high outside temperatures, the refrigerant evaporator 18 of the air-conditioning system may extract greater amounts of heat from the ambient air flowing into the passenger compartment. Thus, deactivating the charge-air cooler 6 or reducing the cooling power of the charge-air cooler by introducing a smaller refrigerant flow may be advantageous under these conditions.

For the reasons stated above, embodiments may also provide at least one control element to control the refrigerant flow through the first refrigerant evaporator and/or through the second refrigerant evaporator can be set and/or apportioned.

Here, the at least one control element may be arranged in the line which functions as a bypass or at some other location in the refrigerant circuit, downstream or upstream, of the first and/or second refrigerant evaporator.

An actuating element may be continuously adjustable in order to precisely dose or set the refrigerant flows. The dimensioning of the refrigerant flows may be performed in an operating-point-specific manner, for example with regard to a required charge pressure. The controller of the control element may take into consideration the load T, the engine speed n, in the case of a liquid-cooled internal combustion engine the coolant temperature, the oil temperature and/or the like, but in particular the outside temperature, the inlet temperature of the compressor, the outlet temperature of the compressor and/or the temperature in the passenger compartment.

In control routine 500, operating conditions may be determined at 504. Operating conditions may include ambient temperature, engine load, or air charge temperature upstream or downstream of a compressor for example. At 506 the engine load may be compared to a high load threshold.

If the engine is found to be operating above the high load threshold as determined at 504, the control routing may continue to 508. At 508 an amount of refrigerant into the second refrigerant evaporator may be decreased. The second refrigerant evaporator may be coupled to an air-conditioning system. An air conditioning system may have an ambient air inlet and may deliver cooled ambient air into the passenger cabin. In some embodiments, the air conditioning system may include a refrigerant evaporator as well as one or more additional air cooling devices.

At 510 and amount of refrigerant delivered to the first refrigerant evaporator may be increased. This first refrigerant evaporator may have an ambient air inlet and may deliver cooled ambient air to an intake system. The intake system may have a compressor coupled upstream or downstream of the first refrigerant evaporator.

Returning to 506, if the engine is found to be operating below the high load threshold as determined at 504, the control routing may continue to 512. Here it may be determined if the temperature of ambient air is above a high temperature threshold. It may also be determined if an amount of passenger compartment cooling is desired by operator input. If an amount of cooling is determined to be desired and/or the ambient air is above a threshold, the method may continue to 514. At 514 an amount of refrigerant into the first refrigerant evaporator may be decreased. At 516 an amount of refrigerant delivered to the second refrigerant evaporator may be increased. This may result in an increased amount of cooling available for passenger compartment cooling and a decreased amount of cooling available for intake charge air.

Control routine 500 may be carried out by a control system that may be responsive to a number of sensors and may be communicatively coupled to one or more actuators. The actuators may include a refrigerant valve coupled to the refrigerant intakes of the first and/or second refrigerant evaporators.

Embodiments may also include at least one control element that is switchable in a two-stage or multi-stage fashion. The control element may be electrically, hydraulically, pneumatically, mechanically or magnetically controllable, preferably by means of an engine controller.

Figure 6:
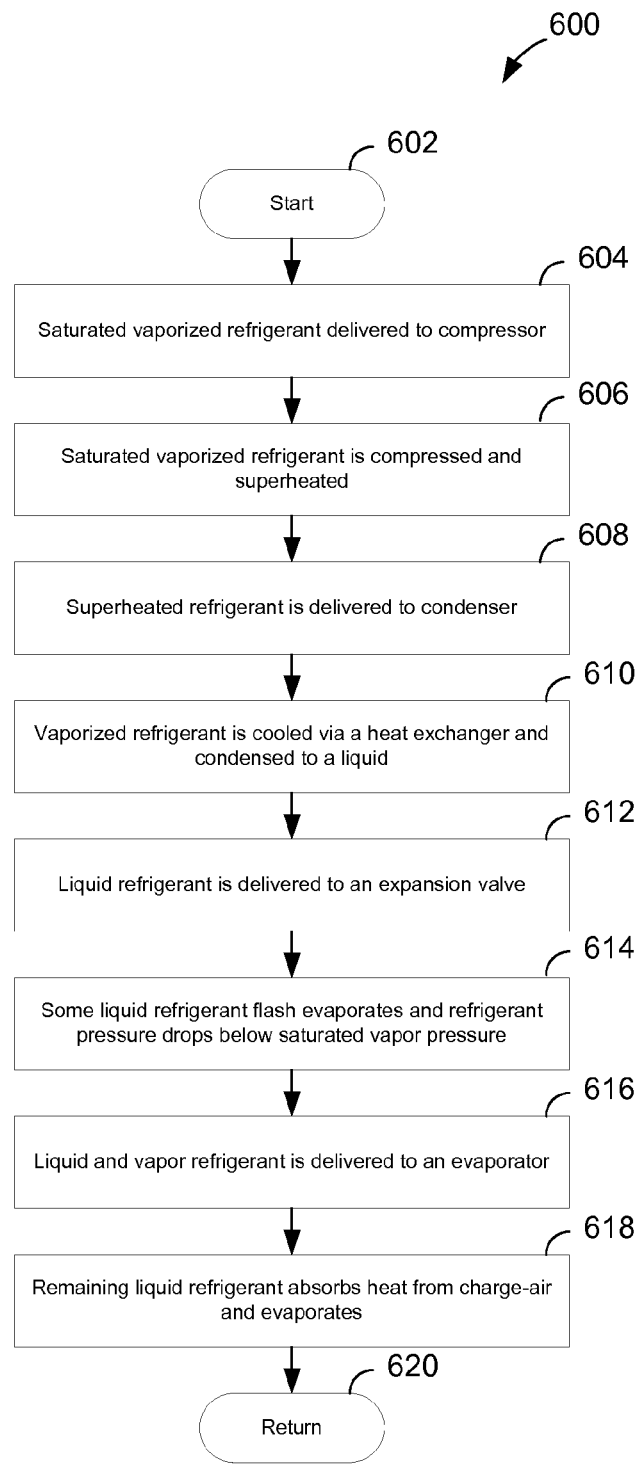
FIG. 6 shows an example operating method for a disclosed embodiment.

An example operating method is depicted in FIG. 6. This example method may correspond to an engine system that includes a refrigerant circuit, such as those depicted in FIG. 2-4. A refrigerant circuit in accordance with an embodiment may include a compressor, a condenser, an expansion valve, and a charge-air cooler that may include a refrigerant evaporator to form a closed circuit. Further embodiments may include an air conditioning system coupled in parallel or series with the charge-air cooler. The air conditioning system may be embodied as a refrigerant evaporator as well as an air-cooled or coolant operated charge-air cooler. Method 600 may be used in combination with another routine that may or may not be disclosed herein, for example, method 600 may be a sub-routine of control routine 500.

At 604 the vaporized refrigerant may be delivered to a compressor. The refrigerant vapor may be at or near saturation at 604. At 606 the vaporized refrigerant may be compressed within the compressor. The compression of the vapor may cause the vaporized refrigerant to become superheated at 606, thus refrigerant vapor may be heated above its boiling point at 606. The condensation and superheating at 606 may be significantly adiabatic.

At 608 superheated refrigerant may be delivered to a condenser. Within the condenser, refrigerant vapor may condense into a liquid. Condensation may result from a decrease in refrigerant temperature within a heat exchanger. The heat exchanger may thermally couple the refrigerant to a liquid or gas at a lower temperature. Heat may be absorbed from the refrigerant into the liquid or gas, which may then be removed from the heat exchanger.

At 612, the condensed liquid refrigerant may be delivered to an expansion valve. An expansion valve may control the flow of coolant through the valve to maintain low pressure within the evaporator downstream of the valve. The expansion valve may be actuated by a control system responsive to a temperature and pressure within the refrigerant circuit downstream of the valve or in the evaporator. The pressure or refrigerant downstream of the valve may be substantially lower than the pressure of refrigerant upstream of the valve. The pressure downstream of the valve may be less than 50% of the saturated vapor temperature of the refrigerant. Liquid refrigerant passing through the expansion valve may evaporate upon passing the pressure drop, this rapid vaporizing may be referred to as flash evaporation and may be significantly adiabatic. Refrigerant downstream of the expansion valve may comprise up to 50% vapor by mass or volume. The temperature of refrigerant downstream of the pressure valve may be significantly lower than the temperature upstream of the expansion valve.

The liquid-vapor refrigerant mixture may be delivered to an evaporator at 616. Refrigerant may be contained within a thermally conductive enclosure or coils within the evaporator. The evaporator may further contain an amount of charge-air thermally coupled and physically isolated from the refrigerant. At 618 refrigerant may absorb heat from the charge-air and may evaporate to form a saturated vapor within the evaporator. In some embodiments the refrigerant may evaporate entirely such that 100% of the refrigerant is in a vaporized state. Other embodiments may partially evaporate the refrigerant such that the refrigerant exiting the evaporator is a liquid-vapor mixture. The pressure within the evaporator may be substantially lower than the saturated vapor pressure for the refrigerant, thus the rate of evaporation may be proportional to the surface area between the refrigerant vapor and refrigerant gas. Embodiments may not include a de-gas bottle and thus refrigerant vapor may remain within the refrigerant circuit. At 620 the process may repeat and refrigerant vapor from the evaporator may again be delivered to the compressor at 604.

If a condenser is provided in the refrigerant circuit, embodiments of the engine may be advantageous wherein the condenser is equipped with a fan impeller.

To provide a high air mass flow to the condenser of the refrigerant circuit when the motor vehicle is stationary or at low vehicle speeds, some embodiments may a high-power fan motor which drives, and sets in rotation, a fan impeller. The fan motor may be electrically operated and assists the heat transfer by convection. A fan of said type may be particularly advantageous in the case of high outside temperatures, when greater amounts of heat are extracted from the refrigerant.

Additionally or alternatively to the charge-air cooler, embodiments may have further heat exchangers in one or more cooling devices specifically in engines which are thermally highly loaded.

The heat released during the combustion by the exothermic, chemical conversion of the fuel may be partially dissipated to the cylinder head and cylinder block via the walls which delimit the combustion chamber and partially to the adjacent components and the environment via the exhaust-gas flow. To keep the thermal loading of the engine within limits, a part of the heat flow introduced into the cylinder head or block may be extracted from the cylinder head or block again.

Due to the higher heat capacity of liquids in relation to air, it is possible for greater amounts of heat to be dissipated by means of liquid-type cooling than with air-type cooling. In liquid-type cooling arrangement embodiments, the engine or the cylinder head may be provided with a coolant jacket 30*a*, including an arrangement of coolant ducts that conduct the coolant through the cylinder head, which may entail a complex cylinder head structure. Here, the mechanically and thermally highly loaded cylinder head may experience decreased structural rigidity as a result of the provision of the coolant ducts. Secondly, the heat need not conducted to the cylinder head surface to be dissipated, as is the case with the air cooling arrangement. The heat is dissipated to the coolant, generally water provided with additives, in the interior of the cylinder head. Here, the coolant may be fed by means of a pump arranged in the cooling circuit, such that said coolant circulates in the coolant jacket 30*a*. The heat dissipated to the coolant may be discharged from the interior of the cylinder head in this way, and is extracted from the coolant again in a heat exchanger. That which has been stated for the cylinder head may also apply to the cylinder block.

In the case of liquid-cooled engines, embodiments may advantageous wherein a cylinder head and/or a cylinder block is connected to the cylinder head equipped with a coolant jacket 30*a*, and a pump for delivering the coolant and a heat exchanger, forming a coolant circuit.

Here, embodiments of the liquid-cooled engine may provide, in the refrigerant circuit, a further refrigerant evaporator through which the refrigerant and coolant can flow and extracts heat from the coolant by at least partial evaporation of the refrigerant.

Figure 7:
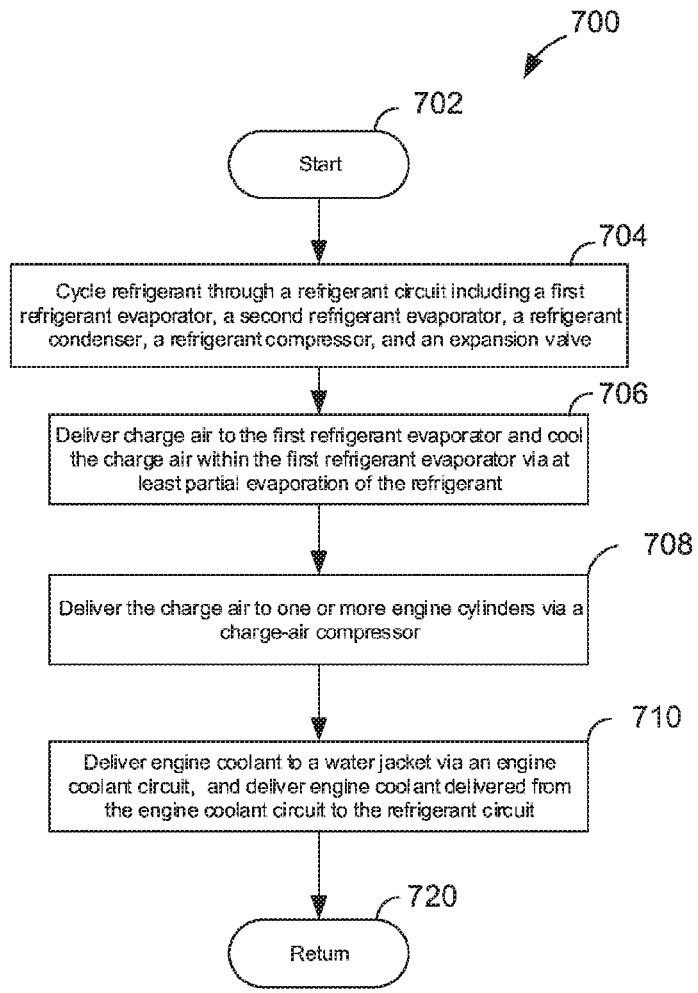
FIG. 7 shows an example operating method for a disclosed embodiment.

An example operating method is depicted in FIG. 7.

At 704 refrigerant is cycled through a refrigerant circuit including a first refrigerant evaporator, a second refrigerant evaporator, a refrigerant condenser, a refrigerant compressor, and an expansion valve.

At 706 charge air is delivered to the first refrigerant evaporator and the charge air is cooled within the first refrigerant evaporator via at least partial evaporation of refrigerant.

At 708 charge air is delivered to one or more engine cylinders via a charge-air compressor.

At 710 engine coolant is delivered to a water jacket via an engine coolant circuit, and engine coolant is delivered from the engine coolant circuit to the refrigerant circuit.

At 720 the process may repeat and refrigerant vapor from the evaporator may again be delivered to the compressor at 704.

Additional heat exchangers may also be provided, for example a transmission oil cooler, an oil cooler, an EGR cooler or a cooler for cooling hydraulic oil.

Some engines embodiments may be equipped with an exhaust-gas recirculation (EGR) arrangement. Exhaust-gas recirculation systems recirculate combustion gases from the exhaust-gas side to the intake side of the engine, this may be used to reduce nitrogen oxide emissions. To obtain a considerable reduction in nitrogen oxide emissions, high exhaust-gas recirculation rates may be of the order of magnitude of $x_{EGR} \approx 50\%$ to $70\%$. The compression of the exhaust gas by cooling may allow for these recirculation rates to be met.

Embodiments of the method may cool charge air in the first refrigerant evaporator upstream or downstream of a compressor.

Embodiments of the method may be advantageous in which the refrigerant flow through the first refrigerant evaporator is controlled as a function of the temperature $T_{compressor,out}$ of the charge air at the outlet of the at least one compressor.

Embodiments of the method may be likewise advantageous wherein the refrigerant flows through the first refrigerant evaporator and is controlled as a function of the temperature $T_{compressor,in}$ of the charge air at the inlet of the at least one compressor.

In some embodiments, heat may be extracted from the refrigerant in the condenser using ambient air.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
cycling refrigerant through a refrigerant circuit, the refrigerant circuit including a first refrigerant evaporator, a second refrigerant evaporator, a refrigerant condenser, a refrigerant compressor, and an expansion valve;
delivering charge air to the first refrigerant evaporator;
cooling charge air within the first refrigerant evaporator via at least partial evaporation of refrigerant;
delivering charge air to one or more engine cylinders via a charge-air compressor; and
delivering engine coolant to a water jacket via an engine coolant circuit and delivering engine coolant from the engine coolant circuit to the refrigerant circuit.

2. The engine method of claim 1, further comprising an air conditioning system, comprising an ambient air inlet and the second refrigerant evaporator, and delivering air from the air conditioning system to a passenger cabin.

3. The engine method of claim 2, further comprising cooling ambient air within the second refrigerant evaporator via at least partial evaporation of refrigerant.

4. The engine method of claim 1, further comprising delivering refrigerant from the first refrigerant evaporator to the second refrigerant evaporator; delivering refrigerant from the second refrigerant evaporator to the first refrigerant evaporator; or delivering a first amount of refrigerant to the first refrigerant evaporator and a second amount of refrigerant to the second refrigerant evaporator.

5. The engine method of claim 4, further comprising determining the first amount of refrigerant and the second amount of refrigerant as a function of an engine load, an engine speed, a refrigerant temperature, an oil temperature, an outside temperature, a compressor inlet temperature, a compressor outlet temperature, a temperature in a passenger compartment, or some combination thereof.

6. The engine method of claim 1, further comprising flash evaporating an amount of liquid refrigerant by controlling a flow of liquid refrigerant through the expansion valve such that a pressure upstream of the expansion valve is greater than a pressure downstream of the expansion valve.

7. The engine method of claim 1, further comprising cooling charge air to a first temperature via either a liquid-type cooling or air-type cooling system; and cooling charge air to a second temperature via the first refrigerant evaporator, the second temperature being below an ambient temperature.

8. A method for operating an engine, comprising:
in a refrigerant circuit, compressing and superheating a vaporized refrigerant via a compressor;
forming a liquid refrigerant by cooling and condensing the vaporized refrigerant;
vaporizing a portion of the liquid refrigerant formed by the cooling and condensing via an expansion valve;
thermally coupling the liquid and the vaporized refrigerant to charge-air within a first refrigerant evaporator;
vaporizing the liquid refrigerant and cooling charge-air in the first refrigerant evaporator, the first refrigerant evaporator without a de-gas bottle and at a pressure below a saturated vapor pressure of the refrigerant; and
delivering engine coolant to a water jacket via an engine coolant circuit and delivering engine coolant from the engine coolant circuit to the refrigerant circuit.

9. The method of claim 8, further comprising controlling a flow of refrigerant through the first refrigerant evaporator as a function of a temperature of charge air at an outlet or inlet of a charge-air compressor.

10. The method of claim 9, further including delivering charge-air from the first refrigerant evaporator to the charge-air compressor, the charge-air compressor coupled to an engine cylinder.

11. The method of claim 8, wherein vaporizing the portion of the liquid refrigerant via the expansion valve includes delivering refrigerant from a higher pressure portion of the refrigerant circuit into a lower pressure portion of the refrigerant circuit via the expansion valve.

12. The method of claim 8, further comprising cooling charge-air to a temperature below an ambient temperature.

13. The method of claim 8, further comprising vaporizing 100% of the liquid refrigerant in the first refrigerant evaporator.

14. An engine system, comprising:
a cylinder head coupled to a cylinder block,
an exhaust-gas discharge system, comprising an outlet opening of the cylinder block coupled to an exhaust line;
an intake system, comprising an inlet opening of the cylinder block coupled to an intake line, the intake system including a charge-air compressor;
a charge-air cooler coupled to the intake system, the charge-air cooler including a first refrigerant evaporator through which a refrigerant and charge air can flow, wherein the charge-air cooler does not include a de-gas bottle;
a refrigerant compressor, a condenser and an expansion valve are provided downstream of the first refrigerant evaporator so as to form a refrigerant circuit; and
a second refrigerant evaporator in the refrigerant circuit through which refrigerant and ambient air flows.

15. The engine system of claim 14, wherein the charge-air cooler is arranged upstream of the charge-air compressor.

16. The engine system of claim 14, wherein the charge-air compressor is a mechanical supercharger or is a compressor of an exhaust-gas turbocharger, the exhaust-gas turbocharger including a turbine that is located in the exhaust-gas discharge system.

17. The engine system of claim 14, wherein the second refrigerant evaporator is arranged in series with the first refrigerant evaporator or in parallel wherein, in a parallel configuration, the second refrigerant evaporator branches off from the refrigerant circuit upstream of the first refrigerant evaporator and is re-coupled to the refrigerant circuit downstream of the first refrigerant evaporator.

18. The engine system of claim 14, further comprising a liquid-type cooling arrangement, wherein the cylinder head includes a refrigerant circuit and a coolant jacket.

\* \* \* \* \*